United States Patent [19]

Palentyn et al.

[11] Patent Number: 4,644,128
[45] Date of Patent: Feb. 17, 1987

[54] LASER CONTOUR CUT MANIFOLDS

[75] Inventors: Gunther H. Palentyn, Grand Blanc; James R. Dehlinger, Ada; Donald R. Rigsby, Jenison, all of Mich.

[73] Assignee: Benteler Corporation, Grand Rapids, Mich.

[21] Appl. No.: 820,238

[22] Filed: Jan. 21, 1986

[51] Int. Cl.⁴ .................................. B23K 26/00
[52] U.S. Cl. ................. 219/121 LG; 219/121 LN; 219/121 LD; 901/41; 901/42
[58] Field of Search ............ 219/121 LG, 121 LN, 219/121 PC, 121 PH, 121 LC, 121 LD; 901/41, 42

[56] References Cited

U.S. PATENT DOCUMENTS

| | | | |
|---|---|---|---|
| 3,133,186 | 5/1964 | Greene et al. | 219/125 |
| 3,799,657 | 3/1974 | Dager et al. | 350/247 |
| 3,913,820 | 10/1975 | Valentine | 901/42 |
| 3,993,402 | 11/1976 | Fredrick | 350/285 |
| 4,160,894 | 7/1979 | Stemmler et al. | 219/121 |
| 4,219,370 | 8/1980 | Hoaglin et al. | 148/9.6 |
| 4,248,369 | 2/1981 | Clausen . | |
| 4,252,360 | 2/1981 | Gallaher, Jr. | 294/86 |
| 4,312,622 | 1/1982 | Favareto | 901/42 |
| 4,317,023 | 2/1982 | Gryskiewicz | 219/121 |
| 4,329,564 | 5/1982 | Hazelton et al. | 219/121 |
| 4,335,296 | 6/1982 | Bredow | 219/121 |
| 4,349,182 | 9/1982 | Blackburn | 901/41 X |
| 4,356,376 | 10/1982 | Komanduri et al. | 219/121 |
| 4,359,815 | 11/1982 | Toyoda | 29/568 |
| 4,465,919 | 8/1984 | Röder | 219/121 LG |
| 4,467,168 | 8/1984 | Morgan et al. | 219/121 |
| 4,503,507 | 3/1985 | Takeda et al. | 364/513 |
| 4,590,652 | 5/1986 | Harwood | 219/121 LG X |

FOREIGN PATENT DOCUMENTS 2074084 10/1981 United Kingdom ........ 219/121 LG

OTHER PUBLICATIONS

Article Entitled "Laser Drilling: Standing on the Threshold of Technology", *Decade of Robotics*, 1983, pp. 44, 45 & 47.

*Primary Examiner*—C. L. Albritton
*Attorney, Agent, or Firm*—Price, Heneveld, Cooper, DeWitt & Litton

[57] ABSTRACT

Successively laser cutting configured openings in the walls of tubular manifold members with a plurality of robots and cooperative fixtures circumferentially around a cutting laser focus, the robots sequentially gripping the tubular members secured in exact orientation and position in the respective fixtures, by circumferentially expansible gripping jaws inside the tubular members, and advancing the members to and through a 360 degree pattern about the laser focus. The manifold laterals are subsequently welded to the member around the laser cut openings.

8 Claims, 15 Drawing Figures

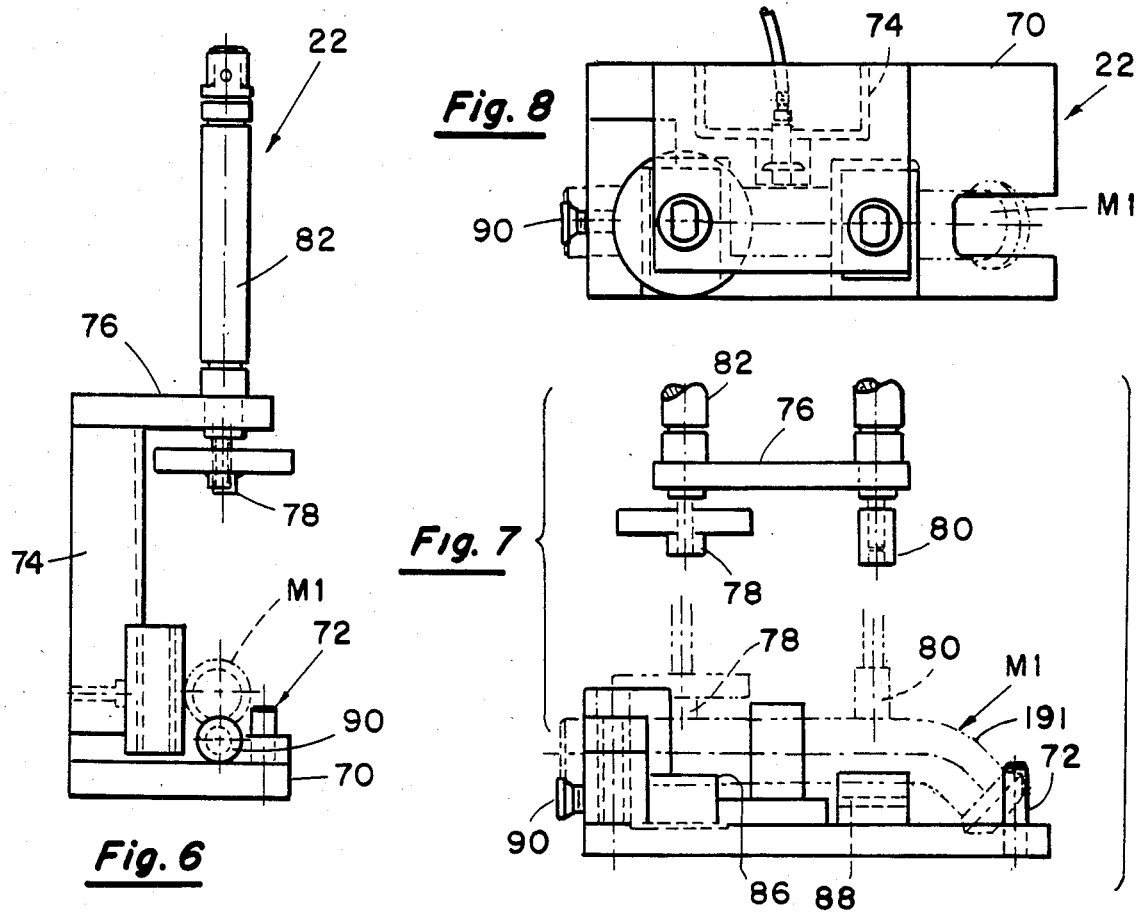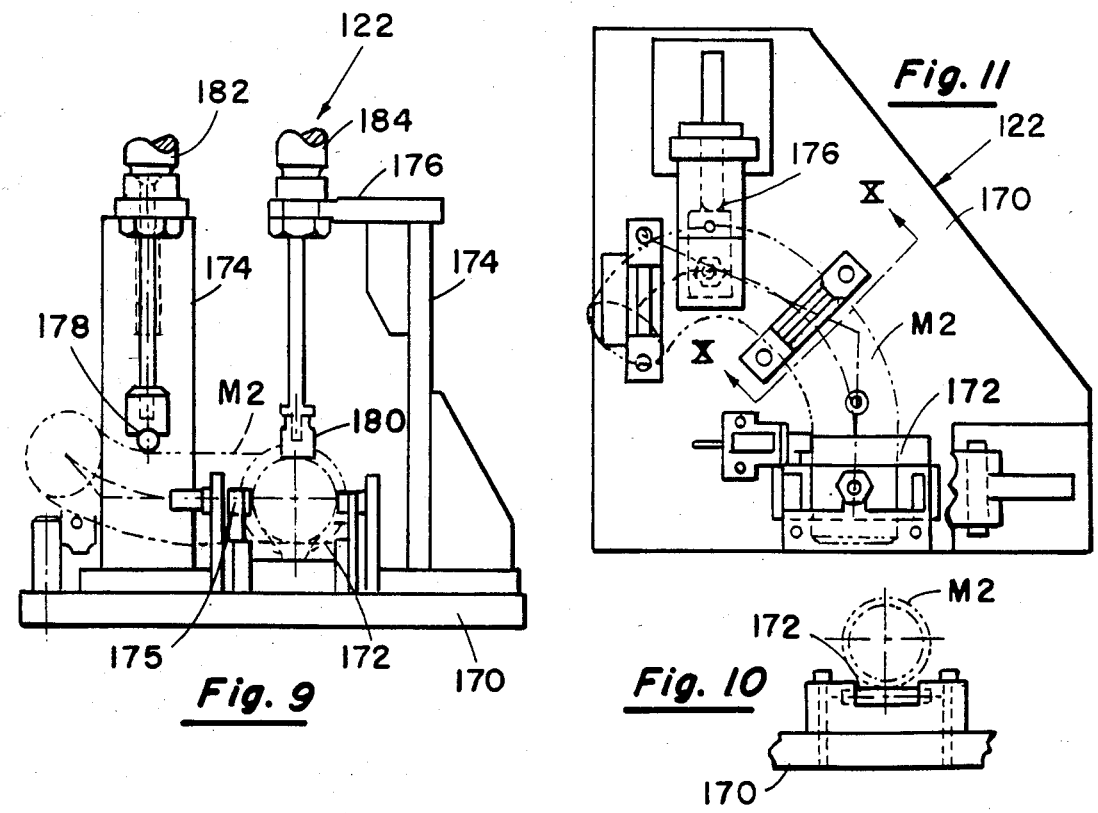

LASER CONTOUR CUT MANIFOLDS

BACKGROUND OF THE INVENTION

This invention relates to the manufacture of manifolds for internal combustion engines.

Some engine manifolds are presently manufactured by welding stainless steel laterals to a stainless steel tubular body after connecting openings are milled or pierced into the body. The body material used has a high chromium content, causing it to be exceedingly wearing on tooling used to form these openings. Milling the openings is expensive and slow. It has the potential of leaving burrs which must be later removed. Piercing produces particularly heavy burrs as the tooling and punches wear, causing difficulty in removing the workpiece from the mandrel, and requiring subsequent burr removal operations. It also tends to deform the workpiece.

SUMMARY OF THE INVENTION

The present invention achieves high speed, accurate, clean cutting of contoured openings in engine manifold components by a cutting laser specially arranged cooperatively with fixtures and robots, programmed to contour cut openings in the sidewalls of successive manifold component members. These members are internally gripped by circumferentially expansible robotic chucks which transfer the workpieces from respective alignment and orientation fixtures to the focal point of the laser beam, followed by robotic manipulation of the workpieces through a 360 degree pattern about the focal point of the laser beam to form configurated openings. A plurality of robots and a plurality of positioning and orientation fixtures are cooperatively positioned circumferentially around the laser beam focal point such that a plurality of manifold members are successively loaded into the fixtures to be sequentially gripped, advanced to the focus, and manipulated in the 360 degree pattern around the focus. The configurated orifices are cut without deforming the workpieces and without producing burrs that would require subsequent finishing operations. The assembly enables rapid operation at reduced cost, for subsequent rapid and accurate weldment of the lateral manifold members to the main body member to form the manifold.

These and other objects, advantages and features of the invention will be apparent upon studying the following specification in conjunction with the drawings.

BRIEF DESCRIPTION OF THE DRAWINGS

FIG. 6 is an end elevational view of a first type of fixture according to this invention;

FIG. 7 is a front elevational view of the fixture in FIG. 6;

FIG. 8 is a top elevational view of the fixture in FIGS. 6 and 7;

FIG. 9 is a front elevational view of a second type of fixture according to this invention;

FIG. 10 is a fragmentary end elevational view of the fixture in FIG. 9;

FIG. 11 is a top plan view of the fixture in FIGS. 9 and 10;

DESCRIPTION OF THE PREFERRED EMBODIMENTS

Figure 1:
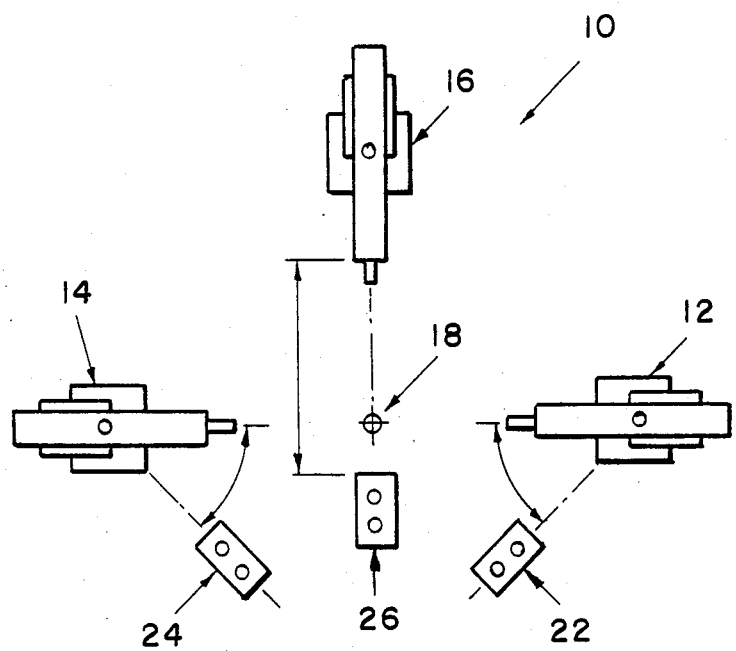
FIG. 1 is a plan schematic view of an embodiment of this invention.

Referring now specifically to the drawings, FIG. 1 sets forth in somewhat schematic form the assembly 10 which includes a plurality, here shown to be three in number, of robot subassemblies 12, 14 and 16 arranged circumferentially around the focus of a laser cutting subassembly 18. The assembly also includes a like plurality of three fixture subassemblies 22, 24 and 26 placed respective to robot subassemblies 12, 14 and 16 for cooperation therewith.

Laser subassembly 18 comprises a conventional laser source such as a 1250 watt carbon dioxide cutting laser which produces a laser beam that is directed by suitable reflecting surfaces (not shown) to direct the beam vertically downwardly to a focal point centered in the midst of the robotic subassemblies to cause metal cutting at this focus.

Figure 12:
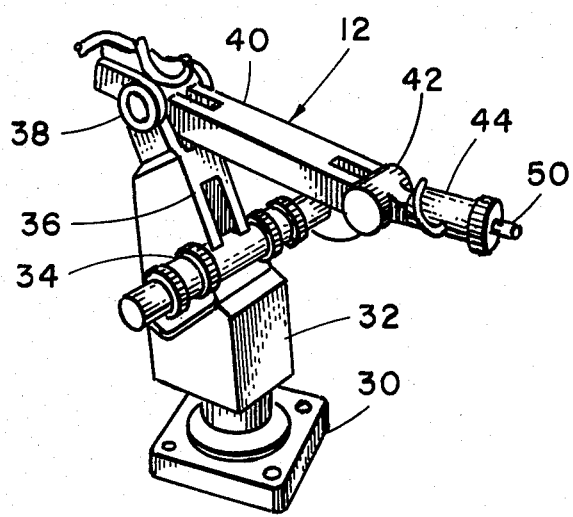
FIG. 12 is a perspective view of one of the robots employed in the invention.

Each of the robotic subassemblies is a multi-dimensionally movable, programmable apparatus such as the "ASEA" brand, all electric robot IRB6 illustrated by subassembly 12 in FIG. 12. Each robot includes a mounting base 30, on which an upright body 32 is rotational on a vertical axis. Projecting upwardly from this body 32 and connected thereto by a transverse horizontal pivot bearing mechanism 34 is an upright, vertical link 36 enabling fore and aft movement in a vertical sweep plane about the axis of pivot 34. Connected pivotally to the upper end of link 36 on a horizontal transverse axis 38 is a horizontal cantilever beam 40 movable up and down in a vertical sweep plane. Pivotally secured to the outer end of cantilevered beam 40 at horizontal transverse pivot bearing 42 is the terminal link 44 movable in an arc in a vertical sweep plane. Link 44 can also be rotated relative to link 40. At the outer free end of link 44 is a gripping chuck subassembly 46. Articulation of this gripper means to any particular position is achieved by combination movement of links 32, 36, 40, and 44 relative to base 30 to which they are attached. This movement is by suitable motive means, preferably electrical motors, but alternatively by pneumatic cylinders, gearing, or the equivalent. Gripper chuck 46 and the workpiece gripped thereby can be advanced, oriented, and rotated, i.e. three dimensionally manipulated on a programmable, controlled basis.

Figure 13:
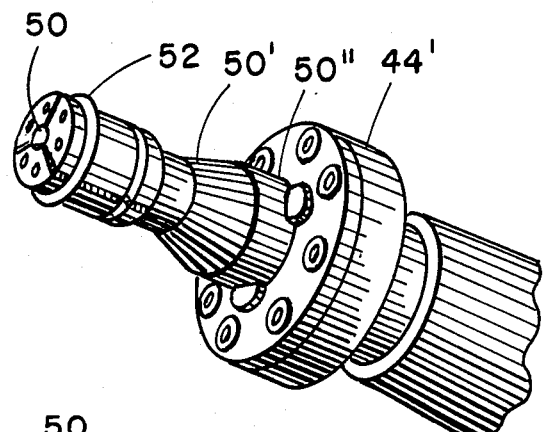
FIG. 13 is an enlarged perspective view of the internal gripping chuck mechanism of the robot of FIG. 12.
Figure 15:
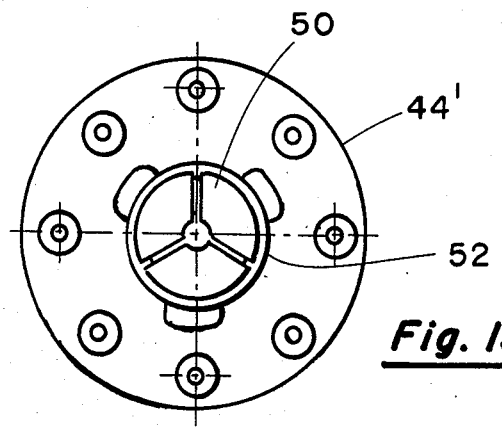
FIG. 15 is an end elevational view of the mechanism in FIG. 14.
Figure 14:
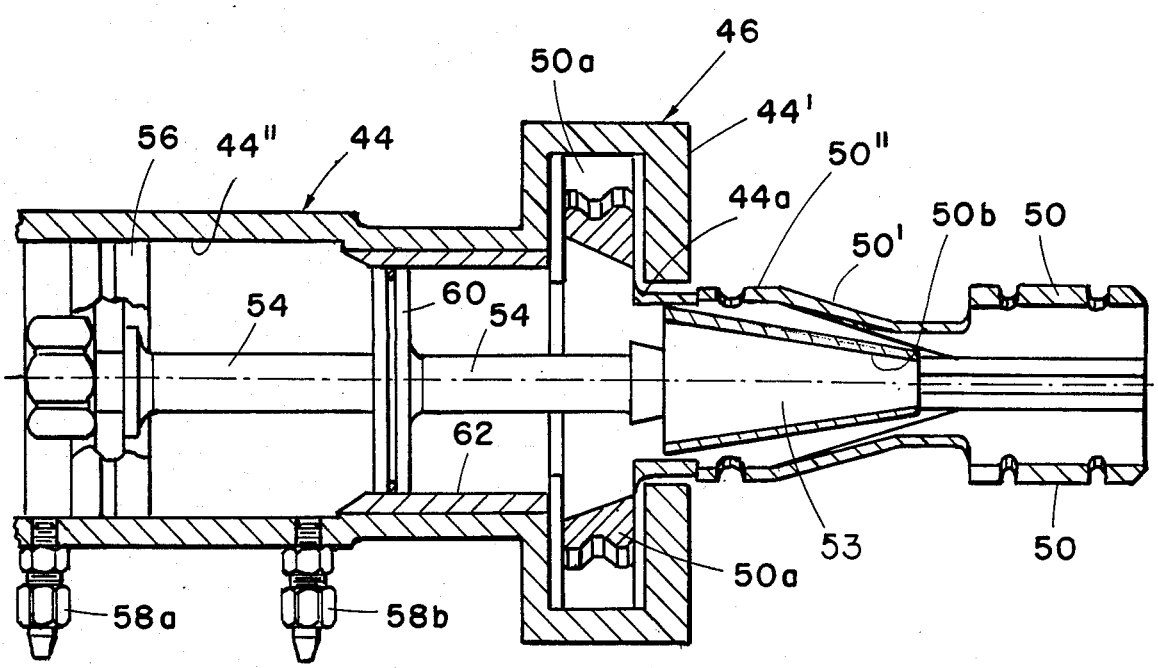
FIG. 14 is a sectional, greatly enlarged view of the chuck mechanism in FIG. 13.

The details of the gripping chuck subassembly 46 are depicted more specifically in FIGS. 13, 14 and 15. The gripper is a circumferentially expansible mechanism, shown to be formed of a plurality of three interfitting jaws 50, each pie-shaped in cross section, to form a cylindrical configuration. In the illustrated embodiment, the three jaws each extend approximately 120 degrees and interfit with each other to form the cylindrical assembly having a gripping surface (preferably knurled) on the outer periphery. Preferably the outer surfaces of the gripping jaws 50 have at least one, here two, annular grooves therearound to receive a rubber O-ring 52 or the equivalent. With circumferential expansion of the gripper chuck, an inner surface of a tubular generally cylindrical workpiece is tightly engaged to prevent the tubular workpiece from slipping axially or circumferentially. The O-ring is stretchable, resilient and has return memory, serving not only to retract the jaws toward each other once the expansion force is removed, but also to provide additional gripping surface to the inner wall of the workpiece being gripped. The knurled portions of the jaws are at the outer ends thereof, with the adjacent portions 50' of the jaws being smaller in diameter so as to remain out of engagement with the workpiece being gripped. Supplemental gripping surfaces 50'', of comparable diameter to that at 50, but larger than that at 50', are immediately adjacent the abutment collar 44' of member 44 (FIG. 14). Inside collar 44' is a cylindrical space which receives the radially enlarged inner ends 50a of individual jaw members 50. These inner ends extend radially within collar 44' to secure the jaws to member 44.

Jaws 50 are radially-outwardly shiftable to circumferentially expand the jaw assembly. This is done by a tapered expander 53 within the jaw assembly, axially outwardly of collar 44', and movable along the longitudinal axis thereof to spread the jaws. This frustoconical expander is connected to a piston rod 54 having a piston 56 on the inner end thereof. This piston is mounted within the cylinder 44'' of member 44, to be shifted backward and forward by hydraulic fluid entering and exiting at the piston-straddling ports 58a and 58b. Piston rod 54 also preferably includes guide element 60 within a cylindrical sleeve 62 to assure only linear movement of expander 53. The conical outer surface of expander 53 is engageable with the cooperative tapered conical inner surfaces 50b of jaws 50. Thus, extension of piston 56, piston rod 54, and expander 52 toward the outer end causes the expander to engage jaws 50 and shift them radially outwardly, the jaws pivoting on the annular inner surface 44a of collar 44'. This circumferentially expands the chuck. Retraction of the expander allows the jaws to shift radially inwardly toward each other, especially under the bias of resilient O-ring 52.

Figure 4:
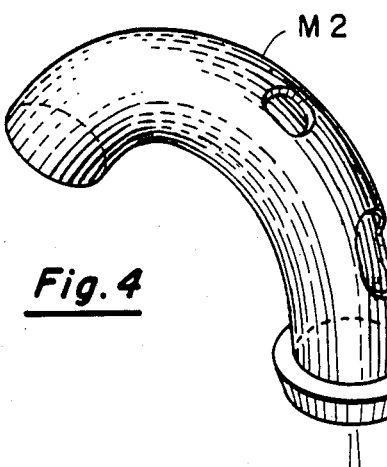
FIG. 4 is a perspective view of a third illustrative type of manifold member processed in accordance with this invention.
Figure 3:
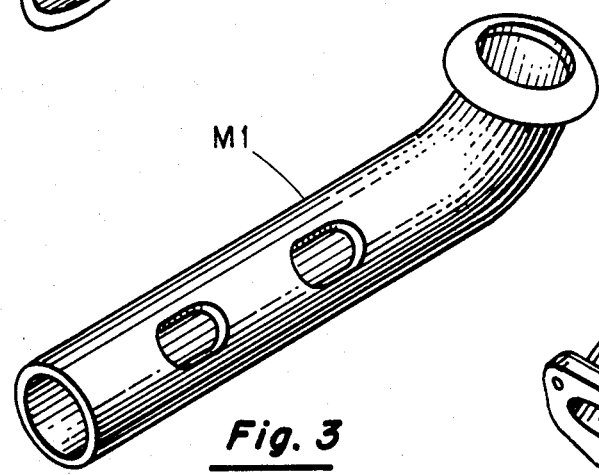
FIG. 3 is a perspective view of a second type of manifold member processed according to this invention.

Two illustrative types of fixture subassemblies are depicted in FIGS. 6-8 and 9-11 respectively. It will be understood that each fixture accommodates a particular configuration of manifold member to be processed. Thus, the fixture in FIGS. 6-8 will be employed for the manifold member M1 in FIG. 3, while the fixture in FIGS. 9-11 will be employed for the manifold member M2 in FIG. 4. By describing the two particular fixtures depicted, those in the art will understand the features to enable them to provide a particular fixture for a particular manifold member to be processed.

Referring first to FIGS. 6-8, the fixture subassembly 22 there depicted includes a base 70 upon which a configurated bed 72 is mounted. Also mounted to the base is a superstructure for supporting clamping means and actuator mechanism therefor. More specifically, the superstructure is shown to include an upright 74 and an overhanging member 76 attached thereto, with a pair of clamps supported thereon. These clamps include engagement members 78 and 80 (FIG. 7) to be downwardly shifted into engagement with the tubular manifold member M1 positioned on configurated bed 72. These engagement members 78 and 80 are mounted on the extended lower ends of piston rods forming part of a pair of pneumatic cylinders 82 and 84 respectively attached to support member 76. Extension of pneumatic cylinders 82 and 84 causes the engagement elements 78 and 80 to clamp the manifold member M1 to the bed of the fixture, while retraction of the cylinders frees the manifold member to be moved. The bed of the fixture is configurated to cause the manifold member to be placed in a predetermined position and predetermined orientation at the fixture. Thus, in the fixture of FIGS. 6-8, a pair of saddle members 86 and 88 receive the manifold member, while an axially movable locator 90 is shiftable against one end of the manifold member or workpiece to drive it against a stop pin 92 on the other end for locating it. When the workpiece is properly positioned and oriented, a sensor 75 such as a photoelectric detector or a limit switch becomes activated to signal the associated robot for action.

The manifold member M1 may be manually or automatically inserted onto the support bed of the fixture, followed by shifting of element 90 to put the workpiece in the desired location and orientation, and clamping of the workpiece into a locked position by the fluid cylinders. This prepares it for exact gripping of the workpiece by the chuck mechanism of FIGS. 13-15 of the robot.

In the fixture of FIGS. 9-11, there are comparable components to those in the fixture of FIGS. 6-8, but arranged in a somewhat different position to accommodate the different configuration of member M2. For convenience, these components are given the same number but with the prefix number 1. This subassembly 122 includes a support base 170, configurated bed 172, superstructure with its uprights 174 and overhanging members 176, and fluid cylinders 182 and 184 having engagement members 178 and 180. Sensor 175 detects if the workpiece is in correct position.

In operation of the novel apparatus, a series of manifold members are provided with configurated laser cuts by the robotic subassemblies 12, 14 and 16 operating sequentially relative to the laser cutting focal point. The fixture subassemblies 22, 24 and 26 may be different from each other, or may be alike, depending upon the configuration of the manifold members to be processed. With the cutting laser activated and the programmed robotic subassemblies operative, manifold members are manually or automatically inserted into the fixture subassemblies and thereafter clamped into predetermined position and orientation. Robotic subassembly 12 is then activated to arcuately shift into alignment with fixture 22 by rotation of body 32 on base 30. Extension of expansible chuck 50 axially into the manifold member is followed by circumferential expansion thereof to accurately grip the manifold member. The fixture is then released by retraction of its cylinders, enabling the robot to rotate into alignment with the focal point of the laser subassembly, followed by axial extension of the robot to that focal point. The robot is then advanced through a 360 degree pattern around the focal point to form an opening of desired configuration in the manifold member. Simultaneously, the robotic subassembly 14 advances to grip the member in fixture 24. If a second or third opening is to be provided in the first manifold member, robot 12 is shifted to that location and advances the manifold member in another 360 degree pattern about the focal point. The robots 14 and 16 proceed sequentially through these steps in sequential fashion so that successive manifold members are rapidly and efficiently advanced to the single cutting laser.

Figure 2:
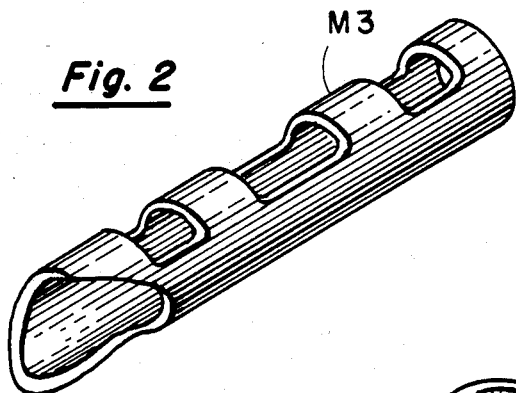
FIG. 2 is a perspective view of one type of manifold member processed in accordance with this invention.
Figure 5:
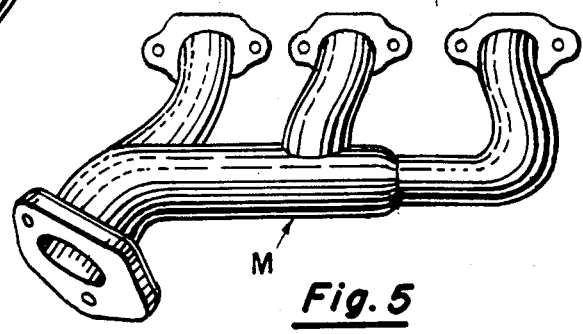
FIG. 5 is a perspective view of an illustrative manifold assembled from the components processed according to this invention.

Thus, openings such as those shown in manifold member M1 (FIG. 3), manifold member M2 (FIG. 4), or manifold member M3 (FIG. 2), are formed to accommodate the particular laterals to be welded thereto such as, for example, to form a complete manifold of the type shown at M in FIG. 5. The end of each lateral is weldably attached to the main body around the periphery of a particular laser cut opening.

It is conceivable that the details of construction of the assembly depicted as illustrative, the fixtures, and the rotobic subassemblies, may vary from those particularly set forth, without departing from the scope of the invention. Thus, the invention is intended to be limited only by the scope of the appended claims and the reasonably equivalent structures and methods defined therein.

The embodiments of the invention in which an exclusive property or privilege is claimed are defined as follows.

1. Apparatus for laser cutting a configured opening in the wall of a tubular manifold member having an open end, comprising:
    at least one fixture having exterior body clamping means for clamping the exterior of a tubular manifold member in a predetermined position and predetermined orientation in said fixture;
    at least one multi-dimensionally-active robot spaced from said fixture;
    elongated circumferentially expansible tube gripping means on said robot for expanding within the tubular member to grip it;
    said robot being movable in a manner to cause axial alignment of said elongated tube gripping means with the open end of a tubular member clamped in said fixture, and movable axially toward said fixture to insert said expansible tube gripping means into the tubular member through the open end thereof, for expansion thereof to grip the inside wall of the tubular member;
    a laser beam source for directing a cutting laser beam toward a focal point;
    said robot being movable toward said focal point to transfer the tubular member to said focal point; and
    said robot being movable to advance through a programmed 360 degree pattern around said focal point in a manner to cause a configured opening to be laser cut into the wall of the tubular manifold member.

2. The apparatus in claim 1 wherein:
    said fixture includes a configured bed, and said clamping means is movable toward said bed to fixedly clamp the tubular manifold body thereon.

3. The apparatus in claim 1 wherein:
    said elongated tube gripping means comprises a plurality of engagement elements arranged in a 360 degree pattern, each having a wall engaging portion on the radial outer portion thereof, and means for spreading said elements whereby said elements can collectively grip the inner wall of the manifold body.

4. Apparatus for successively laser cutting configurated openings in the walls of tubular manifold members, each having an open end, comprising:
    a plurality of fixtures each having exterior body clamping means for clamping the exterior of a tubular manifold member in a predetermined position and predetermined orientation in said fixture;
    a like plurality of multi-dimensionally-active robots spaced from respective ones of said fixtures to be cooperative therewith;
    elongated circumferentially expansible tube gripping means on each said robot for expanding within a tubular member in a respective fixture to grip the tubular member;
    a laser beam source, and laser beam orienting means for orienting a cutting laser beam toward a focal point;
    said robots being arranged circumferentially around said focal point, and programmable to cooperate sequentially with said laser focal point;
    each said robot being movable in a manner to cause axial alignment of its said elongated tube gripping means with the open end of a tubular member clamped in the respective said fixture, and movable axially toward said fixture to insert said expansible tube gripping means into the tubular member through the open end thereof, for expansion thereof to grip the inside wall of the tubular member;
    each robot, after expansion of said gripping means, being movable toward said focal point to transfer the tubular member to said focal point; and
    each said robot being movable to advance through a programmed 360 degree pattern around said focal point in a manner to cause a configured opening to be laser cut into the wall of the tubular manifold member.

5. The apparatus in claim 4 wherein:
    each said fixture includes a configured bed, and its said clamping means is movable toward said bed to fixedly clamp the tubular manifold body thereon.

6. The apparatus in claim 4 wherein:
    each said elongated tube gripping means comprises a plurality of engagement elements arranged in a 360 degree pattern, each having a wall engaging portion on the radial outer portion thereof; and tapered means for spreading said elements whereby said elements can collectively grip the inner wall of the manifold body.

7. A method of laser cutting configured openings into the side wall of a tubular manifold member, comprising the steps of:
    providing a configurated tubular stainless steel manifold member having an open end;
    inserting into said open end an expansible robotic gripper, and expanding the gripper in a manner to grip the inner walls of the tubular member for maneuvered positioning of the member;
    directing a laser beam toward a focal point; and
    moving the clamp and tubular member in a programmed pattern of 360 degrees about said focal point to cut a configured opening into the wall of the member.

8. A method of forming an exhaust manifold comprising the steps of:
    providing a configurated tubular stainless steel manifold member having an end opening;
    inserting an expansible gripper through said end opening into said member;
    expanding said gripper to grip said tubular member;
    directing a cutting laser beam toward the side wall of said member while advancing said member relative to said laser beam in a 360 degree pattern in a manner to cut a configured opening through said side wall; and
    welding to said member around said opening one end of a lateral tube.

* * * * *